(12) United States Patent
Kong et al.

(10) Patent No.: US 9,285,631 B2
(45) Date of Patent: Mar. 15, 2016

(54) DISPLAY DEVICE, TRANSFLECTIVE THIN FILM TRANSISTOR ARRAY SUBSTRATE AND MANUFACTURING METHOD THEREOF

(71) Applicant: BOE TECHNOLOGY GROUP CO., LTD., Beijing (CN)

(72) Inventors: Xiangchun Kong, Beijing (CN); Seong-Yeol Yoo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/080,876

(22) Filed: Nov. 15, 2013

(65) Prior Publication Data

US 2014/0138717 A1    May 22, 2014

(30) Foreign Application Priority Data

Nov. 16, 2012  (CN) .......................... 2012 1 0466092

(51) Int. Cl.
*H01L 33/08* (2010.01)
*G02F 1/1335* (2006.01)
*G02F 1/1343* (2006.01)
*G02F 1/1362* (2006.01)

(52) U.S. Cl.
CPC ........ *G02F 1/133555* (2013.01); *G02F 1/1362* (2013.01); *G02F 1/134363* (2013.01)

(58) Field of Classification Search
None
See application file for complete search history.

(56) References Cited

U.S. PATENT DOCUMENTS

| 5,604,358 | A | * | 2/1997 | Kim | ...................... | G02F 1/1368 |
| | | | | | | 257/59 |
| 5,920,083 | A | * | 7/1999 | Bae | ...................... | H01L 27/1214 |
| | | | | | | 257/59 |
| 6,633,359 | B1 | * | 10/2003 | Zhang | ............... | G02F 1/136286 |
| | | | | | | 349/139 |
| 2007/0109455 | A1 | | 5/2007 | Kim et al. | | |
| 2009/0262286 | A1 | * | 10/2009 | Nishida | ............. | G02F 1/133555 |
| | | | | | | 349/114 |
| 2009/0262287 | A1 | * | 10/2009 | Nishida | ............. | G02F 1/133555 |
| | | | | | | 349/114 |

(Continued)

FOREIGN PATENT DOCUMENTS

| CN | 101192578 A | 6/2008 |
| CN | 102023432 A | 4/2011 |
| CN | 102544025 A | 7/2012 |
| CN | 202473923 U | 10/2012 |

OTHER PUBLICATIONS

Chinese First Office Action Dated Mar. 21, 2014, Application No. 201210466092.3, 9 Pages.

(Continued)

*Primary Examiner* — Duy T Nguyen
*Assistant Examiner* — Bo Bin Jang
(74) *Attorney, Agent, or Firm* — Brooks Kushman P.C.

(57) ABSTRACT

The present invention provides a display device, a transflective thin film transistor array substrate and a manufacturing method thereof, the manufacturing method comprises: providing a substrate; forming a gate line, a data line which is broken when passing through a gate line area, a gate electrode, a reflective electrode and a common electrode line; forming a patterned gate insulating layer and an active layer located above the gate insulating layer; forming a pixel electrode, a source electrode, a drain electrode, a connection line of the data line and a channel; forming a passivation layer and a common electrode via hole; forming a common electrode. The present invention can avoid the problem of poor display effect under strong light.

8 Claims, 3 Drawing Sheets

(56) References Cited

U.S. PATENT DOCUMENTS

2010/0224880 A1* 9/2010 Kimura ............... H01L 27/1225
  257/59
2012/0168760 A1   7/2012 Sun et al.

OTHER PUBLICATIONS

Chinese Search Report Dated Mar. 11, 2014, Application No. 2012104660923, 2 Pages.
Second Chinese Office Action Dated Oct. 10, 2014, Application No. 201204660923, Applicant Boe Technology Group Co., Ltd., 3 Pages.

* cited by examiner

DISPLAY DEVICE, TRANSFLECTIVE THIN FILM TRANSISTOR ARRAY SUBSTRATE AND MANUFACTURING METHOD THEREOF

CROSS-REFERENCE TO RELATED APPLICATIONS

The present application claims priority to the Chinese application No. 201210466092.3, filed Nov. 16, 2012, the entire contents of which are incorporated herein by reference.

TECHNICAL FIELD

This invention relates to a display field, and more particularly to a display device, a transflective thin film transistor array substrate and a manufacturing method thereof.

BACKGROUND

A thin film transistor-liquid crystal display (TFT-LCD) has advantages of a small size, low power consumption and radiation free and plays a leading role in the current market of a flat panel display.

In a current manufacturing process of a transflective thin film transistor liquid crystal display panel, reflective electrodes and pixel electrodes in an array substrate are formed together in one patterning process so that the display effect of a display panel under strong light is poor and the brightness of a reflective area and the brightness of a transmissive area are not uniform.

SUMMARY

The technical problem to be solved by the present invention is to provide a display device, a transflective thin film transistor array substrate and the manufacturing method thereof so as to solve the problems that the display effect under strong light is poor and the brightness on the reflective area and the brightness on the transmissive area are not uniform.

In order to solve the above technical problem, the embodiment of the present invention provides a manufacturing method of transflective thin film transistor array substrate, wherein, comprises the following steps:

S11, providing a substrate;

S12, forming a metal film on the substrate, forming a pattern comprising a gate line, a data line which is broken when passing through a gate line area, a gate electrode, a reflective electrode and a common electrode line by a patterning process, wherein the gate line and the data line are vertical, the gate line is connected to the gate electrode, an area on which the reflective electrode is located is a reflective area, an area between the reflective electrode and the common electrode line is a transmissive area;

S13, forming a gate insulating layer, a semiconductor film and a doped semiconductor film on the substrate after finishing step 12, forming a pattern comprising the patterned gate insulating layer and an active layer located above the gate insulating layer by a patterning process;

S14, forming a first transparent conductive film on the substrate after finishing S13, forming a pattern comprising a pixel electrode, a source electrode, a drain electrode, a connection line of the data line and a channel by a patterning process;

S15, forming a passivation layer on the substrate after finishing step 14, forming a pattern comprising a common electrode via hole by a patterning process;

S16, forming a second transparent conductive film on the substrate after finishing S15, forming a pattern comprising a common electrode by a patterning process, wherein the common electrode is connected to the common electrode line through the common electrode via hole.

Wherein the step S12 comprises:

forming a metal film on the substrate;

adopting a mask to process the metal film in a patterning process, forming the pattern comprising the gate line, the data line which is broken when passing through a gate area, the gate electrode, the reflective electrode and the common electrode line.

Wherein the step S13 comprises:

forming the gate insulating layer on the gate line, the data line which is broken when passing through a gate line area, the gate electrode, the reflective electrode and the common electrode line;

forming the semiconductor film and the doped semiconductor film on the gate insulating layer;

processing the gate insulating layer, the semiconductor film and the doped semiconductor film by using a half tone or grey tone mask in a patterning process, forming a pattern comprising the patterned gate insulating layer and the active layer.

Wherein, the step of processing the gate insulating layer, the semiconductor film and the doped semiconductor film by using a half tone or grey tone mask in a patterning process, forming a pattern comprising the patterned gate insulating layer and the active layer comprises:

coating a layer of photoresist on the doped semiconductor film;

adopting the half tone or gray tone mask to expose, so as to make the photoresist form a photoresist-totally-removed area, a photoresist-totally-remained area and a photoresist-half-remained area, the photoresist-totally-remained area corresponding to an area on which the pattern of the active layer is located, the photoresist-totally-removed area corresponding to an area on which the pattern of the via hole for the connection line of the data line and the transmissive area, and the photoresist-half-remained area corresponding to an area having patterns other than the above patterns, after developing process, the thickness of the photoresist on the photoresist-totally-remained area being not changed, the photoresist on the photoresist-totally-removed area being totally removed, the thickness of the photoresist on the photoresist-half-remained area being decreased;

totally etching the doped semiconductor film, the semiconductor film and the gate insulating layer on the photoresist-totally-removed area by a first etching process, forming a pattern of the via hole for the connection line of the data line and exposing the transmissive area on the substrate;

removing the photoresist on the photoresist-half-remained area by an ashing process, exposing the doped semiconductor film in the area;

totally etching the doped semiconductor film and the semiconductor film on the photoresist-half-remained area by a second etching process, forming a pattern of the active layer;

lifting off the remained photoresist.

Wherein the step S14 comprises:

forming a first transparent conductive film on the patterned gate insulating layer and the active layer, processing the first transparent conductive film by using the mask with a patterning process, forming a pattern comprising the pixel electrode, the source electrode and the drain electrode, the connection line of the data line and the channel;

wherein the source electrode is located on the connection line of the data line, the drain electrode and the pixel electrode are connected to form a whole, the connection line of the data line connects the broken data line through the via hole for the connection line of the data line.

Wherein the step S15 comprises:

forming the passivation layer on the pixel electrode, the source electrode, the drain electrode, the connection line of the data line and the channel;

forming a pattern comprising the common electrode via hole passing through the passivation layer and the gate insulating layer by using a mask in a patterning process.

Wherein the passivation layer comprises an at least two layers structure of alternation of an inorganic layer and an organic layer.

Wherein the organic layer is made of a photosensitive organic material.

Wherein the step S16 comprises:

forming a second transparent conductive film on the passivation layer in which the common electrode via hole is provided;

processing the second transparent conductive film by using a mask in a patterning process, forming a pattern comprising the common electrode, wherein the common electrode is connected to the common electrode line through the common electrode via hole.

Wherein the common electrode has a slot structure.

The embodiment of the present invention further provides a transflective thin film transistor array substrate, comprising: a gate line, a data line, a common electrode line, a reflective electrode, a pixel electrode, a common electrode and a thin film transistor formed on a substrate, wherein the area on which the reflective electrode is located is a reflective area, an area between the reflective electrode and the common electrode line is a transmissive area, wherein, the gate line, the date line and the reflective electrode are arranged on the same layer, the gate line and the data line are vertical to each other, the data line is broken when passing through the gate line area, a connection line of the data line is set between the date lines which are broken by the same gate line and located on the same straight line, the connection line of the data line is used to connect the broken data lines.

Wherein a gate insulating layer is formed on the gate line, the date line and the reflective electrode, the gate insulating layer is also provided with a via hole of the connection line of the date line, the connection line of the data line connects the broken data lines through the via hole for the connection line of the data line.

Wherein a passivation layer is formed between the pixel electrode and the common electrode.

Wherein the passivation layer comprises an at least two layers structure of alternation of an inorganic layer and an organic layer.

Wherein the organic layer is made of a photosensitive organic material.

Wherein the common electrode has a slot structure.

Wherein the above array substrate further comprises a common electrode via hole passing through the passivation layer and the gate insulating layer, the common electrode is connected to the common electrode line through the common electrode via hole.

The embodiment of the present invention further provides a display device, comprises the above mentioned transflective thin film transistor array substrate.

The above technical solutions according the present invention bring out the technical effect as follows.

In the above solutions, the gate line, the data line, the gate electrode, the common electrode line and the reflective electrode are simultaneously formed in one patterned process, so that the display effect under strong light is significantly improved and the phenomena that the brightness of the reflective area and the brightness of the transmissive area are not uniform is also significantly improved.

The present invention will be more clearly understood from the description of preferred embodiments as set forth below, with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In order to clearly set forth the objects, technical solutions and advantages of embodiments of the present invention, the embodiments of the present invention are further described in conjunction with drawings and embodiments.

Figure 1:
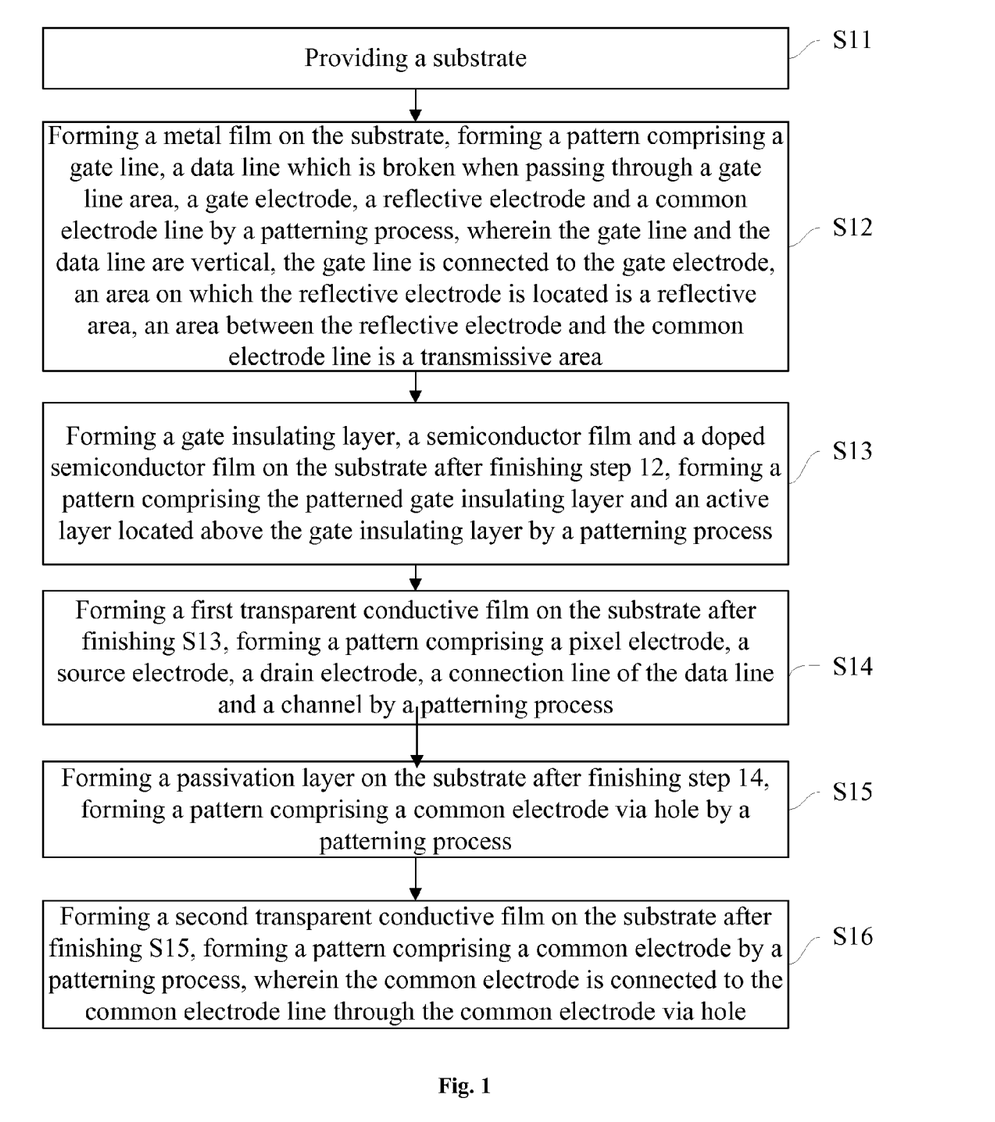
FIG. 1 is a general flow chart of a manufacturing method of a transflective thin film transistor array substrate according to one embodiment of the present invention.

As shown in FIG. 1, an embodiment of the present invention provides a manufacturing method of transflective thin film transistor array substrate, which comprises the following steps:

S11, providing a substrate;

S12, forming a metal film on the substrate, forming a pattern comprising a gate line, a data line which is broken when passing through a gate line area, a gate electrode, a reflective electrode and a common electrode line by a patterning process, wherein, the gate line and the data line are vertical but not intersecting, the gate line is connected to the gate electrode, an area on which the reflective electrode is located is called a reflective area, an area between the reflective electrode and the common electrode line is called a transmissive area;

S13, forming a gate insulating layer, a semiconductor film and a doped semiconductor film on the substrate after finishing step 12, forming a pattern comprising the patterned gate insulating layer and an active layer located above the gate insulating layer by a patterning process;

S14, forming a first transparent conductive film on the substrate after finishing S13, forming a pattern comprising a pixel electrode, a source electrode, a drain electrode, a connection line of the data line and a channel by a patterning process;

S15, forming a passivation layer on the substrate after finishing step 14, forming a pattern comprising a common electrode via hole by a patterning process;

S16, forming a second transparent conductive film on the substrate after finishing S15, forming a pattern comprising a common electrode by a patterning process, the common electrode is connected to the common electrode line through the common electrode via hole.

According to the above embodiment of the present invention, when the gate lines, the data lines and the gate electrodes are formed on the substrate, the reflective electrodes and the transmissive areas are simultaneously formed on the pixel areas defined by the gate lines and the data lines so that the display effect under strong light is improved as compared with prior art. Under the conventional transmitting display mode, if the ambient light is strong, the intensity of the backlight will be counteracted so that the display is not clear. In the present invention, the reflective electrodes are formed on the same time that the gate lines, the data lines and the gate electrodes are formed, the intensity of the backlight is efficiently increased, so that the display effect under strong light is significantly improved.

The specific implementation of step S11 of the above method is as follows.

Providing a clean substrate 1 after a cleaning process, the material of the substrate 1 may be selected from glass, quartz and transparent resin, but not limited to them.

Figure 2:
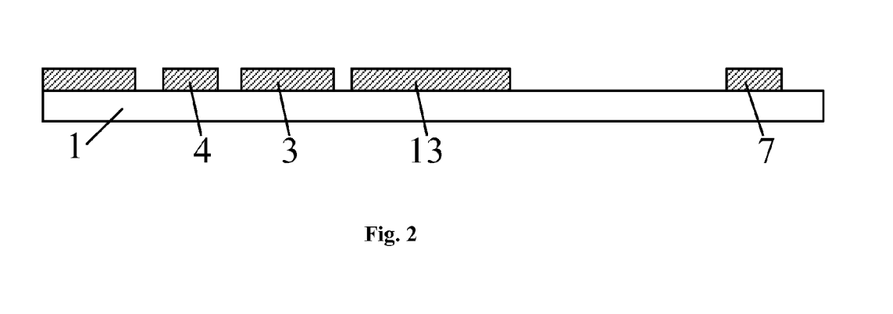
FIG. 2 is a cross section diagram after a first patterning process of the method as shown in FIG. 1.

As shown in FIG. 2, the specific implementation of step S12 in the above method comprises:

S121, forming a metal film on the substrate 1;

Specifically, forming a metal film on the substrate 1 by magnetron sputtering, depositing and so on;

Preferably, the thickness of the metal film is in the range of 1000 Å to 5000 Å. The material of the metal film may be molybdenum, aluminum, neodymium, aluminum nickel alloy, molybdenum-tungsten alloy, chrome or copper, or a combination of those metal materials.

Step 122, adopting a common mask to process the metal film in a patterning process, forming a pattern comprising a gate line, a data line 3 which is broken when passing through a gate line area, a gate electrode 4, a reflective electrode 13 and a common electrode line 7.

Specifically, applying photoresist coating, exposure, development, etching, photoresist lifting off and so on to the metal film so as to form a pattern comprising the gate line (not shown in FIG. 2), the data line 3 which is broken when passing through the gate area, the gate electrode 4, the reflective electrode 13 and the common electrode line 7.

Figure 3:
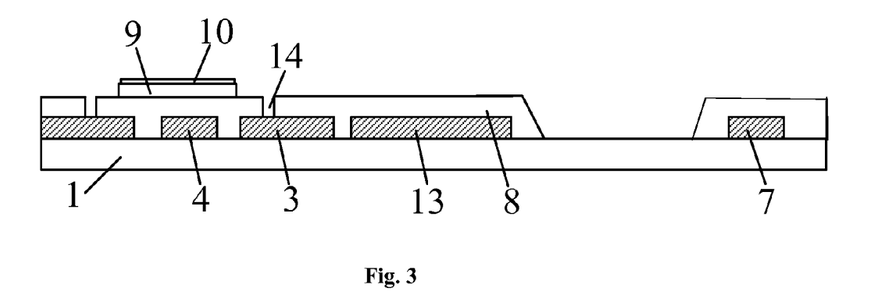
FIG. 3 is a cross section diagram after a second patterning process of the method as shown in FIG. 1.

As shown in FIG. 3, the specific implementation of step S13 in the above method comprises:

Step S131, forming a gate insulating layer on the gate line, the data line 3 which is broken when passing through the gate line area, the gate electrode 4, the reflective electrode 13 and the common electrode line 7, Wherein a film may be formed as the gate insulating layer by chemical vapor deposition, coating or other method;

Further, the thickness of the film is in the range of 1000 Å to 7000 Å.

Step S132, forming a semiconductor film 9 on the gate insulating layer;

Wherein the semiconductor film is formed on the substrate on which the gate insulating layer has formed by chemical vapor deposition, coating or other method;

Preferably, the thickness of the semiconductor film is in the range of 1000 Å to 7000 Å.

Step S133, forming a doped semiconductor film 10 on the semiconductor film 9;

Wherein, the doped semiconductor film 10 is formed on the substrate on which the semiconductor film 9 has been formed by chemical vapor deposition, coating or other method;

Preferably, the thickness of the doped semiconductor film 10 is in the range of 500 Å to 6000 Å.

Step S134, processing the gate insulating layer, the semiconductor film 9 and the doped semiconductor film 10 by using a half tone or grey tone mask with a patterning process, forming a pattern comprising the patterned gate insulating layer 8 and the active layer, the active layer comprising the semi-conductor layer 9 and the doped semiconductor layer 10 being formed on the gate insulating layer and above the gate electrode 4.

Preferably, the implementation of step S134 comprises:

Step 1341, coating a layer of photoresist on the doped semiconductor film 9;

Step 1342, adopting a half tone or gray tone mask to expose, so as to make the photoresist form a photoresist-totally-removed area, a photoresist-totally-remained area and a photoresist-half-remained area, the photoresist-totally-remained area corresponding to an area on which the pattern of the active layer is located, the photoresist-totally-removed area corresponding to an area on which the pattern of the via hole for the connection line of the data line and the transmissive area, and the photoresist-half-remained area corresponding to an area having patterns other than the above patterns, after developing process, the thickness of the photoresist on the photoresist-totally-remained area being not changed, the photoresist on the photoresist-totally-removed area being totally removed, the thickness of the photoresist on the photoresist-half-remained area being decreased;

Step S1343, totally etching the doped semiconductor film, the semiconductor film and the gate insulating layer on the photoresist-totally-removed area by a first etching process, forming the pattern of the via hole 14 for the connection line of the data line and exposing the transmissive area on the substrate 1, that is, forming a patterned gate insulating layer 8;

Step S1344, removing the photoresist on the photoresist-half-remained area by an ashing process, exposing the doped semiconductor film 10 in this area;

Step S1345, totally etching the doped semiconductor film 10 and the semiconductor film 9 on the photoresist-half-remained area by a second etching process, forming a pattern of the active layer;

Step S1346, lifting off the remained photoresist.

Wherein, oxide, nitride or oxynitride may be used for the gate insulating layer, the corresponding reaction gas may be a mixed gas of $SiH_4$, $NH_3$, $N_2$ or the mixed gas of $SiH2Cl_2$, $NH_3$, $N_2$.

The active layer comprises the semi-conductor layer 9 and the doped semiconductor layer 10, and the active layer is formed on the gate insulating layer and above the gate electrode 4.

Figure 4:
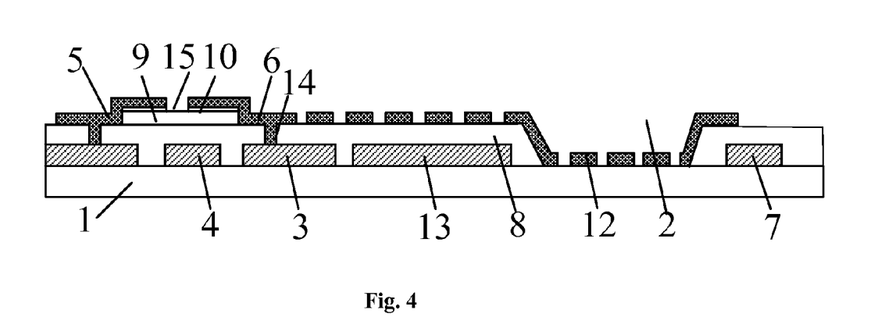
FIG. 4 is a cross section diagram after a third patterning process of the method as shown in FIG. 1.

As shown in FIG. 4, the specific implementation of step S14 comprises:

Step S141, forming a first transparent conductive film on the patterned gate insulating layer and the active layer, Wherein, the first transparent conductive film is formed by magnetron sputtering, evaporation or other method.

Step S142, processing the first transparent conductive film by using a common mask with a patterning process, forming a pattern comprising a pixel electrode 12, a source electrode 5, a drain electrode 6, the connection line of the data line and a channel 15;

Wherein the source electrode is located on the connection line of the data line, the drain electrode 6 and the pixel electrode 12 are connected to form a whole, the connection line of the data line connects the broken data line through the via hole for the connection line of the data line, the doped semiconductor film 10 on the channel 15 area is totally etched and the semiconductor film 9 is exposed.

Specifically, by a patterning process, photoresist coating, exposure, development, etching, photoresist lifting off and so on are applied to the first transparent conductive film so as to form a pattern comprising the pixel electrode 12, the source electrode 5, the drain electrode 6, the connection line of the data line and the channel 15. The channel 15 may be formed in the same etching process as that the pixel electrode 12, the source electrode 5, the drain electrode 6, the connection line of the data line are formed. Since the thickness of the doped semiconductor film 10 is less than the thickness of the gate insulating layer, over-etching is applied in the process that the pixel electrode 12, the source electrode 5, the drain electrode 6 and the connection line of the data line are formed so as to form the channel 15. The channel 15 may be formed by another etching process after the etching process that the pixel electrode 12, the source electrode 5, the drain electrode 6 and the connection line of the data line are formed.

Wherein, the pixel electrode 12 may have a panel structure or a slot structure. Preferably, the pixel electrode 12 is a slot structure. As compared with a conventional pixel electrode, since the density of electrode field lines generated on both sides of the slot structure is larger, the corresponding electrical field generated between the pixel electrode and the common electrode is stronger.

Indium Tin Oxide (ITO), Indium Zinc Oxide (IZO) and Aluminum Zinc oxide may be used for the first transparent conductive film. Other transparent metallic oxide may also be used.

Figure 5:
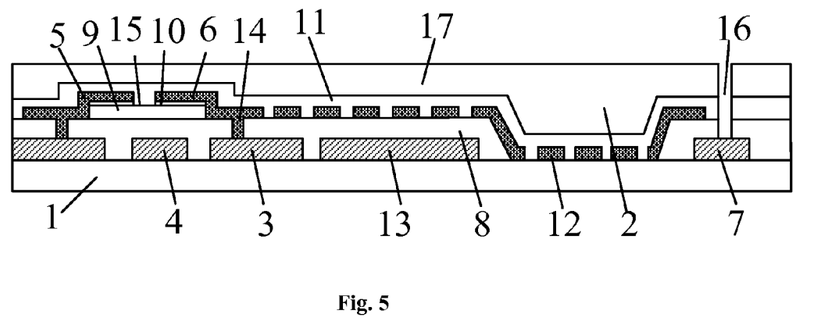
FIG. 5 is a cross section diagram after a fourth patterning process of the method as shown in FIG. 1.

As shown in FIG. 5, the specific implementation of step S15 comprises:

Step S151, forming a passivation layer on the pixel electrode 12, the source electrode 5, the drain electrode 6, the connection line of the data line and the channel 15;

The passivation layer can be formed on the substrate on which the pixel electrode 12, the source electrode 5, the drain electrode 6, the connection line of the data line and the channel 15 have been formed by chemical vapor deposition, coating and other method.

Preferably, the thickness of the passivating layer is in the range of 1000 Å to 7000 Å. The passivation layer comprises an at least two layers structure of alternation of an inorganic layer and an organic layer, for example, an inorganic-organic two layers structure, or an inorganic-organic-inorganic three layers structure. FIG. 5 shows an inorganic-organic two layers structure, the passivation layer comprises an inorganic layer 11 and an organic layer 17.

Preferably, a photosensitive organic material may be used for the organic layer 17 of the passivation layer, for example, a photosensitive resin material or other material. Therefore, the photoresist coating and removing process is omitted Wherein oxide, nitride or oxynitride may be used for the inorganic layer of the passivation layer, the corresponding reaction gas may be a mixed gas of $SiH_4$, $NH_3$, $N_2$ or a mixed gas of $SiH2Cl_2$, $NH_3$, $N_2$. A photosensitive material may be used for the organic layer, for example, photosensitive resin or other organic material. In the embodiment, the organic layer and the inorganic layer are used to form an inorganic-organic two layers structure or an inorganic-organic-inorganic multiple layers structure of the passivation layer, and the top surface is flat finally.

Step S152, forming a pattern comprising the common electrode via hole 16 passing through the passivation layer and the gate insulating layer by using a common mask in a patterning process.

Specifically, photoresist coating, exposure, development, etching, photoresist lifting off and so on are applied to the passivation layer by a patterning process, so as to form a pattern of the common electrode via hole 16. If the upper layer of the passivation layer is an organic layer 17 which is made of a photosensitive organic material, the photoresist coating and removing process may be omitted, and exposure, development and etching process are applied to form the pattern of the common electrode via hole 16.

In the embodiment, an inorganic-organic two layers passivation layer or an inorganic-organic-inorganic multiple layers passivation layer structure is used. On one hand, the adhesive force between the up layer film and the down layer film is increased as a layer of cushion area; on the other hand, interfaces among multiple layers of materials are used to refract the reflecting light in different angles, adjust the angles of light entering into the passivation layer in a nonvertical angle, decrease light loss on an upper polaroid and a black matrix caused by the incident angle of the reflecting light in the reflective area as compared with passing through the upper of the polaroid with a larger light intensity. The inorganic layer above the organic layer and the inorganic layer below the organic layer are not limited to the same inorganic material. For display devices having different sizes and applications, the ratio of the reflective area and the transmissive area of the pixel area and the thickness of the passivation layer should be adjusted accordingly. For a display device which is mainly used for reflection display under an environment having a relative large light intensity such as outdoors or a display device in which other reflective areas (areas corresponding to the reflective electrode) are larger than 20% of the display area (an area corresponding to the pixel electrode), an inorganic layer 11 having the thickness of 100 Å to 2000 Å and an organic layer 17 having a thickness bigger than 2-10 um may be used for light intensity harmony. For other display devices in which 1% of the display area<the reflective area<50% of the display area, an inorganic layer 11 having the thickness of 500 Å to 3000 Å and an organic layer 17 having the thickness of 0-6 um may be used to obtain the optimal display effect and reduce the difference between the light intensity in the reflective area and the light intensity in the transmissive area into a minimum value. Furthermore, a light sensitive organic material is used for the organic layer 17 so as to efficiently react to the light intensity, so that the problem that the reflective area and the transmissive area do not have uniform brightness is solved.

Figure 6:
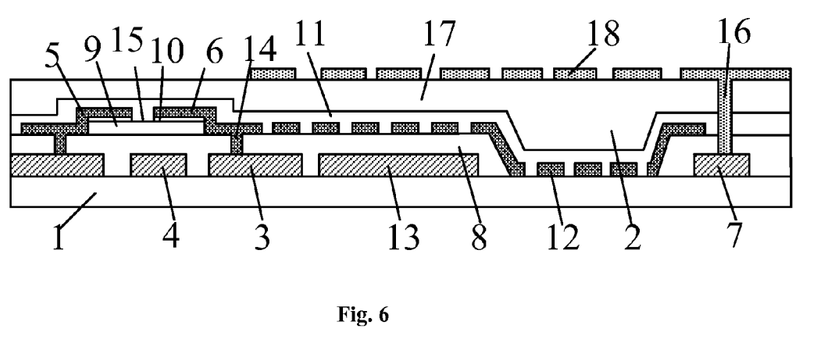
FIG. 6 is a cross section diagram after a fifth patterning process of the method as shown in FIG. 1.

As shown in FIG. 6, the specific implementation of step S16 comprises:

Step S161, forming a second transparent conductive film on the passivation layer in which the common electrode via hole is arranged;

Wherein the second transparent conductive film is formed by magnetron sputtering, evaporation or other method.

Step S162, processing the second transparent conductive film by using a common mask with a patterning process, forming a pattern comprising the common electrode 18, the common electrode 18 is connected to the common electrode line 7 through the common electrode via hole 16.

Specifically, in a patterning process, photoresist coating, exposure, development, etching, photoresist lifting off and so on are applied to the second transparent conductive film so as to form a pattern comprising the common electrode 18.

Wherein, the common electrode 18 may be formed by directly lifting off, the common electrode 18 is connected to the common electrode line 7 through the common electrode via hole 16.

Preferably, the common electrode has a slot structure. As compared with a conventional panel electrode, since the density of electrode field lines generated on both sides of the slot structure is larger, the corresponding electrical field generated between the pixel electrode and the common electrode is stronger.

Figure 7:
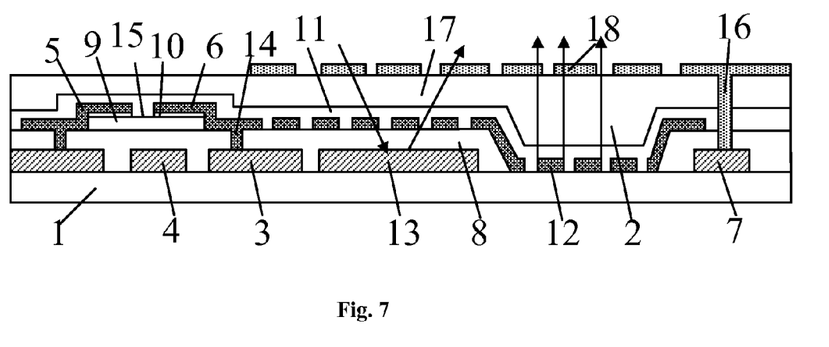
FIG. 7 is a schematic diagram illustrating light transmitting and reflecting conditions of the array substrate formed by the method shown in FIG. 1.

As shown in FIG. 7, since the transmitting display is a common display type, under this display mode, if the ambient light is strong, the light intensity of the backlight source will be counteracted, so that the display is not clear. In the embodiment of the present invention, since the reflective electrode is added, the light intensity of the backlight can be effectively increased, so that the display effect under strong light is significantly improved. Furthermore, in the embodiment of the present invention, after an organic layer is added to the passivation layer, there is an interface between the organic layer and the inorganic layer, the transmissive area won't be affected because the incident angle of the light source is vertical to the interface. However, in the reflective area, since refraction rate in the inorganic layer is large, the refraction angle in the organic layer is small, as compared with the prior art, the reflective area can have more light intensity. In the embodiment, the light intensity of the reflective area is closer to the light intensity of transmissive area depending on the backlight source. The reflective electrode and the gate line are formed at the same time during the first patterning process. When the data line is connected (that is when the connection line of the data line connects to the data line through the via hole 14 for the connection line), the source electrode and the drain electrode are formed and the organic layer and the inorganic layer are combined in the passivation layer, so that the display effect under strong light is significantly improved and the problem that the reflective area and the transmissive area do not have uniform light intensity is solved. Furthermore, the organic passivation layer is used to remove the height difference between the pixel area and the device area, the probability of defect during a cell forming procedure is decreased. In the alignment process during the cell forming procedure, since there is a height difference between the pixel area and the device area, difficulties caused in rubbing alignment process of polyimide (PI) film will increase the probability of defect during a cell forming procedure. In the structure according to the embodiment of the present invention, since the height difference is decreased, the above problem may be avoided.

As shown in FIG. 6, the embodiment of the present invention provides a transflective thin film transistor, comprising: a substrate 1; a gate line, a data line 3, a reflective electrode 13, a common electrode line 7, a pixel electrode 12, a common electrode 18 and a thin film transistor TFT formed on the substrate. The area in which the reflective electrode 13 is located is a reflective area. An area between the reflective electrode 13 and the common electrode line 7 is a transmissive area 2. The gate line, the date line 3 and the reflective electrode 13 are arranged on the same layer. The gate line and the data line 3 are vertical to each other. The data line 3 is broken when passing through the gate line area. A connection line of the data line is set between the date lines 3 which are broken by the same gate line and located on the same straight line. The connection line of the data line is used to connect the broken data lines 3.

In the embodiment of the present invention, when the gate line and the data line which is broken when passing through the gate line area are formed on the substrate, reflective electrodes are simultaneously formed on the pixel area defined by the gate line and the data line, the display effect under strong light is efficiently improved.

Wherein a gate insulating layer is formed on the gate line, the date line 3 and the reflective electrode 13, the gate insulating layer is also provided with a via hole 14 for the connection line of the date line, the connection line of the data line connect the broken data lines 3 through the via hole 14 for the connection line of the data line.

In the embodiment of the present invention, the pixel electrode 12 may have a panel structure or a slot structure. Preferably, the pixel electrode 12 has a slot structure.

Furthermore, a passivation layer is formed between the pixel electrode 12 and the common electrode 18.

Wherein, the passivation layer comprises an at least two layers structure of alternation of an inorganic layer and an organic layer. Specifically, the passivation layer comprises an inorganic-organic two layers structure as shown in FIG. 5 or FIG. 6, or an inorganic-organic-inorganic three layers structure as required.

Preferably, the organic layer is made of a photosensitive organic material, for example, a photosensitive resin material or other organic materials.

The embodiment of the present inventions provides a passivation layer structure. On one hand, the adhesive force between the up layer film and the down layer film is increased as a layer of cushion area; on the other hand, interfaces among multiple layers of materials are used to refract the reflecting light in different angles, adjust the angles of light entering into the passivation layer in a nonvertical angle, decrease light loss on an upper polaroid and a black matrix caused by the incident angle of the reflecting light in the reflective area as compared with passing the upper of the polaroid with a larger light intensity. The inorganic layer above the organic layer and the inorganic layer below the organic layer are not limited to the same inorganic material. For display devices having different sizes and applications, the ratio of the reflective area and the transmissive area of the pixel area and the thickness of the passivation layer should be adjusted accordingly. For a display device which is mainly used for reflection display under an environment having a relative large light intensity such as outdoors or a display device in which other reflective areas are larger than 20% of the display area, an inorganic passivation layer 11 having the thickness of 100 Å to 2000 Å and an organic layer 17 having a thickness bigger than 2-10 um may be used for light intensity harmony. For other display devices in which 1% of the display area<the reflective area<50% of the display area, an inorganic passivation layer 11 having the thickness of 500 Å to 3000 Å and an organic layer 17 having the thickness of 0-6 um may be used to obtain the optimal display effect and reduce the difference between the light intensity in the reflective area and the light intensity in the transmissive area into a minimum value. Furthermore, a light sensitive organic material is used for the organic layer 17 so as to efficiently react to the light intensity, so that the problem that the reflective area and the transmissive area do not have uniform brightness is solved.

Preferably, the common electrode 18 has a slot structure.

The above array substrate further comprise: a common electrode via hole 16 passing through the passivation layer and the gate insulating layer 8, wherein the common electrode 18 is connected to the common electrode line 7 through the common electrode via hole 16.

The embodiment of the present invention further provides a display device, comprising the above transflective thin film transistor array substrate. The display device may be a liquid crystal panel, an electrical paper, an OLED panel, a cell phone, a flat panel computer, a television, a monitor, a laptop, a digital camera, a navigator or any product or component having display functionality.

The above mentioned are only the embodiments of the present invention, which is not intended to limit the protection scope of the present invention. Thus any change, alternative, and modification within the spirit and principle of the embodiment of the present invention should belong to the scope of protected by the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transflective thin film transistor array substrate, comprising: a gate line, a data line, a common electrode line, a reflective electrode, a pixel electrode, a common electrode and a thin film transistor formed on a substrate, wherein the thin film transistor comprises a source electrode and a drain electrode, an area on which the reflective electrode is located is a reflective area, an area between the reflective electrode and the common electrode line is a transmissive area, wherein the gate line, the data line, the reflective electrode and the common electrode line are arranged in the same layer, the gate line and the data line are vertical to each other, the data line is broken when passing through the gate line, a connection line of the data line is set between the data lines which are broken by the same gate line and located on the same straight line, the connection line of the data line is used to connect broken data lines, wherein the pixel electrode, the source electrode, the drain electrode and the connection line of the data line are arranged in the same layer.

2. The transflective thin film transistor array substrate according to claim 1, wherein a gate insulating layer is formed on the gate line, the data line and the reflective electrode, the gate insulating layer is also provided with a via hole of the connection line of the data line, the connection line of the data line connects the broken data lines through the via hole for the connection line of the data line.

3. The transflective thin film transistor array substrate according to claim 1, wherein a passivation layer is formed between the pixel electrode and the common electrode.

4. The transflective thin film transistor array substrate according to claim 3, wherein the passivation layer comprises an at least two layers structure of alternation of an inorganic layer and an organic layer.

5. The transflective thin film transistor array substrate according to claim 4, wherein the organic layer is made of a photosensitive organic material.

6. The transflective thin film transistor array substrate according to claim 1, wherein the common electrode has a slot structure.

7. The transflective thin film transistor array substrate according to claim 1, further comprising a common electrode via hole passing through a passivation layer and a gate insulating layer, the common electrode is connected to the common electrode line through the common electrode via hole.

8. A display device, comprising the transflective thin film transistor array substrate according to claim 1.

* * * * *